(12) United States Patent
Soltysik

(10) Patent No.: US 7,916,170 B2
(45) Date of Patent: Mar. 29, 2011

(54) CCTV PIPELINE INSPECTION SYSTEM DATA MANAGEMENT SYSTEM AND COMPUTER-BASED MONITORING/ACTION APPLICATION

(76) Inventor: Robert Charles Soltysik, Pensacola, FL (US)

(*) Notice: Subject to any disclaimer, the term of this patent is extended or adjusted under 35 U.S.C. 154(b) by 1330 days.

(21) Appl. No.: 11/447,719

(22) Filed: Jun. 7, 2006

(65) Prior Publication Data

US 2007/0297752 A1    Dec. 27, 2007

(51) Int. Cl.
*H04N 7/18* (2006.01)
(52) U.S. Cl. ........................................................ 348/92
(58) Field of Classification Search .................. None
See application file for complete search history.

(56) References Cited

U.S. PATENT DOCUMENTS

| | | | | |
|---|---|---|---|---|
| 5,791,063 A * | 8/1998 | Kesler et al. | | 33/651 |
| 6,320,173 B1 * | 11/2001 | Vock et al. | | 250/206.1 |
| 7,313,759 B2 * | 12/2007 | Sinisi | | 715/234 |
| 7,536,462 B2 * | 5/2009 | Pandya | | 709/227 |
| 7,684,347 B2 * | 3/2010 | Merkey et al. | | 370/252 |

* cited by examiner

*Primary Examiner* — Nhon T Diep
(74) *Attorney, Agent, or Firm* — Eric Hanscom; Todd J. Langford

(57) ABSTRACT

The Invention provides specific and proprietary means to digitally record CCTV inspection Header Information, Defect Observation Data, GPS information, and Distance Information; combine this data into a single digital file; and store it within single video files preferable over digital video format like MPEG, DiviX, Microsoft Windows Media, DVD, or related formats—from which it may be retrieved by compatible application software and serve as a basis for inspection viewing, reviewing, evaluation, mapping, report generation, and other uses provided or supported by compatible application software features. Formatted media can be played with media player like Microsoft media player, real player, Dix Player, Quick time player like computer based player and/or with any external media player like DVD player which can be connected to system like television for viewing.

8 Claims, 4 Drawing Sheets

FIG. 1: Prior art

FIG 2. Prior process using CD or other digital media.

15. Database system is created to support the information storage related to each video and inspection that can be stored for retrieval system

16. Video and related information like header or defects and/or footage/GPS information can be part of overall application system.

17. A software application system enables the retrieval of various inspections with video and related information, and allows user to update with comments as necessary.

18. The software application allows user to view video by selectively checking the start time or defect point. Application can be available over the internet or in client server mode.

19. The software application may allow user or engineer with given privilege an access to update the information for further action or notification or workflow to automate the steps in the process.

20. Once the correction action is performed and information needs to be updated, user/engineer can update the information remotely on-site or in the system, along with uploading correction video.

21. All information in database and/or server are backed-up routinely for security and future reference. Application allows speeding up retrieval of information and processing time and easy to view media.

FIG. 2

CCTV PIPELINE INSPECTION SYSTEM DATA MANAGEMENT SYSTEM AND COMPUTER-BASED MONITORING/ACTION APPLICATION

CROSS REFERENCE TO RELATED APPLICATIONS

None.

STATEMENT REGARDING FEDERALLY SPONSORED RESEARCH OR DEVELOPMENT

This invention was not federally sponsored.

BACKGROUND OF THE INVENTION

Field of the Invention

This invention relates to a system to manage closed circuit television (CCTV) data acquired in connection with sewer line, manhole, and other pipeline inspections and more specifically, to a data management system (the "Invention") involving a computer program, or software application, which provides a new and more efficient way to perform and manage a series of tasks normally conducted to digitally acquire and store video pipeline inspection data; provide capability to enter and store detailed information commonly referred to as "Header" data; and provide means and methods to capture, calculate, store, relate, and link this information to footage location data that accurately generates and displays the reference footage location of each recorded individual inspection observation to a specific location within the pipeline. The invention also proposes a data management system and application that can be utilized over the internet or in client/server mode for managing and monitoring data and take actions on them.

History:

Closed Circuit TV (CCTV) inspection is normally conducted in sewer lines and other pipelines in an effort to determine physical condition of the host pipe, as well as other conditions affecting that pipe and flows passing through them. The pipeline systems normally consist of contiguous segments of pipes that are separated by access structures (manholes) installed at convenient breakpoints where vertical and/or horizontal alignment changes occur. The condition of individual pipes and pipe joints within such segments is of particular concern to pipeline owners since they are normally intended to carry certain types of flow (sanitary sewage in sewer lines) and to exclude/prevent entry of extraneous flows from other sources—such as groundwater and/or rainwater entering the line through pipe and/or manhole defects.

A. Selection of Lines for Inspection:

Lines are inspected at selected time intervals and for specific purposes—such as:
  (a) Routine Condition Assessment.
  (b) Crisis Management (blockages, etc.).
  (c) Pre-rehabilitation/repair.
  (d) Post-rehabilitation/repair.
  (e) Root Intrusion and Debris Evaluation.

B. Line Inspection Tasks:

Tasks normally associated with CCTV pipeline inspections normally consist of the following:
  (1) Pre-cleaning—Pressurized wash-down, root removal, etc.
  (2) Actual CCTV inspection, data acquisition, and data management.

C. CCTV Inspection—Equipment:

CCTV Equipment is normally installed in a truck that can be parked near a pipeline manhole (access point) and consists of:
  (1) Electrical power system.
  (2) Self-propelled CCTV Camera with light source.
  (3) Operator console with power management controls, CCTV monitor, electronic data logger (computer) and/or video tape recorder, camera control unit, and other accessories.
  (4) Cable reel with multi-conductor cable to transmit electrical power to camera and propulsion unit—and also provide means to transmit video signal from camera (in the pipeline) to the truck control unit.
  (5) Electro-mechanical footage counter—mounted on Cable Reel.
  (6) Cable to connect the cable reel to primary system controls.

D. CCTV Inspection Tasks:

Tasks associated with CCTV pipeline inspection normally consist of:
  (1) Place camera and propulsion unit in sewer line at either an upstream or downstream access point (manhole).
  (2) Adjust slack in the connecting cable and set calibration of the footage counter to accurately indicate distance from camera to primary footage reference/measurement point (usually the center of the access manhole).
  (3) Adjust camera light intensity and picture quality.
  (4) Commence inspection by propelling the camera through the line and observing conditions displayed on video monitor in operator compartment.
  (5) Record observations throughout the length of line.
  (6) Reverse direction of camera, return it to access manhole, and remove from line.

E. Data Acquisition:

Before a new inspection commences, it's necessary to record various "identity" information such as pipeline location, including GPS coordinates, name of pipeline owner, name of inspection technician, date of inspection, pipe material, line lengths—and miscellaneous other data commonly referred to as "Header Information". After this information is tabulated, the camera may proceed through the line and operator may stop the camera at any time to record observations relative to condition of pipe and pipeline content. At the present time, most camera observations are recorded on video tape, data logger internal hard drive, external hard drives, or directly onto CD's. Various software programs are available for this purpose and an assortment of defect coding systems are available to simplify and standardize the process.

Since noted pipeline defects may require expensive repair, it is mandatory that accurate footage measurements from the primary reference point be generated and recorded. The first step of this process is accomplished by a "Footage Counter" mounted on the Cable Reel. As cable moves over a friction-loaded wheel of known diameter, signals are normally generated at 0.10 ft. increments. The wheel's known diameter equates to a known footage per revolution—and signals of the 0.10 ft increments are generated by electro-mechanical means and transmitted to receiving equipment that displays the data as a footage location (to nearest $1/10^{th}$ foot) on the video display in operator's compartment.

F. Data Management:

After pipeline inspection data is captured and recorded in general accordance with steps outlined above, decisions must be made regarding the means and methods to transfer and disseminate the data. This task may be as simple as recording to a CD, or as complex as moving data via removable hard drive to a computer server. From here it may be retrieved, reviewed, evaluated, and can serve as a basis for defect logs, reports—and, ultimately, decisions regarding new construction and/or rehabilitation steps to correct noted deficiencies. Creation of the Problem this Invention Solves:

To accomplish the ultimate goals of a successful CCTV pipeline inspection and correction actions, three distinctly separate and different types of data must be acquired, and/or generated, and integrated into a system that provides storage from which said data may be retrieved and integrated for use by application software to index, tabulate, view, review, manipulate, and perform calculations from which graphic and tabular reports may be generated. These data types consist of:

Header Information
Defect Observations
Footage Location Data

Following parts explains the current methods and related problems for all three types of information that this invention is providing solutions for:

Header Information (1) Standard Method:

Inspections are typically created through use of a live video camera to record video onto a certain type of media. Prior to commencing an inspection, the operator must record or log critical information pertaining to the inspection—in order to assure that someone reviewing the inspection can know/identify what he/she is observing in the video recording. This information is called "Header Information". When a VCR tape is used, the Header Information is typically displayed on the video in the form of a text overlay. If a digital video is recorded, then the user may or may not choose to display the Header Information as a text overlay. Header Information is also stored in a digital log sheet and/or database file for future retrieval.

(2) The Problems:

We have moved into the digital age where most data is now stored digitally. Why should this critical Header Information be stored in a manner that makes it difficult to retrieve?

VCR & Text Overlay Approach

When text overlay is displayed and recorded onto a VCR tape, it becomes part of the video itself. In order to retrieve this information and use it in other ways such as printed reports, or as a comparison to another set of header information, one must manually read it from the video—which is both time-consuming and burdensome. At times, the Header information may be lengthy, so it is typically displayed only at the beginning of the inspection. If a person wishes to look at this information while watching the video, they must rewind to the beginning or manually write the information down.

Standard Digital Video Approach

This approach is a step in the right direction—but it also presents problems of its own. The user may choose to display the Header Information as a text overlay on the video, and this method has the same problems as the "VCR & Text Overlay Approach" described above. Also, the Header Information will be recorded in some form of digital log file, typically a database that will allow data retrieval on demand. This solves a part of the Header Information access problem—but there is a major downfall. This digital log file must accompany the digital video file in order to retrieve the Header Information. Hypothetically, what happens if this file becomes separated from the digital video file? The digital video file is often worthless and thrown out. The inspection must then be re-inspected—a potential cause for major problems such as delays and burdensome costs of re-inspection.

Defect Observation Data

1. The Standard Method:

When performing a CCTV pipeline inspection, observations are normally recorded sequentially as they are viewed by the camera in the pipeline and displayed on the monitor screen. These observations may be manually recorded (handwritten) on paper forms, displayed on the video recording in the form of text overlay, or digitally logged into a file.

2 The Problems:

We have moved into the digital age, and everything is now stored digitally. Why should this critical Observation Information be stored in such a way that it is difficult to retrieve?

Hand Written

This is an out-dated approach that is rarely used in today's digital world. The problem here is that the operator must manually write down information pertaining to each observation. This can be both tedious and time consuming for the operator, leading to inherent dangers of errors in transcription. In addition, a hand written log may not always be legible enough for someone else to review it at a later date. This type of log is also more difficult to manage and sort, and could get separated from the video recording, thus creating more problems.

Text Overlay

When text overlay is displayed and recorded onto a VCR tape, it becomes part of the video itself. In order to retrieve this information and use it in other ways such as, on a printed report, or comparing it to another set of observation information, one must manually read it from the video. This is time consuming and burdensome. The Observation Information is displayed periodically throughout the inspection. If a person wants to look at a particular observation while watching the video, then he/she must fast forward or rewind to find that Observation Information or manually write the information down.

Digitally Logged

This approach is one step into the right direction, although, it has problems of its own too. The user may or may not choose to record the Observation Information as text overlay on the video. This method has the same problems as the "Text Overlay" approach described above. Also, the Observation Information will be recorded in some sort of digital log file, typically a database that will allow a person to retrieve this information on demand. This solves part of the Observation Information access problem, but there is still a major downfall. This digital log file must accompany the digital video file in order to use or retrieve the Observation Information. What happens if this file gets separated from the digital video file? The digital video file is often worthless and thrown out. The inspection must then be re-inspected. This could cause major problems, and result in a loss of thousands of dollars per inspection.

Distance Information

1. The Standard Method:

During CCTV pipeline inspection, footage readings are initially generated from signals originating in an electromechanical counter and converted to footage data displayed on the system monitor and video recording. The footage generation and recording systems provide the only means for a viewer of the recorded data to determine actual location of individual observations within the pipe segment being inspected.

2. The Problems:

We have moved into the digital age where most data is now stored digitally. Why should this critical Distance Information be stored in a manner that makes it difficult to retrieve?

By displaying this Distance Information in the form of Text Overlay, portions of the pipe that are essential for the operator to view may often be obscured. This Distance Overlay may also be stored digitally, but there are problems with this as well.

Text Overlay

When text overlay is displayed and recorded onto a VCR tape, it becomes part of the video itself. In order to retrieve this information and use it in other ways—such as a printed report, or comparing it to another set of Distance Information—one must manually read it from the video. This is time consuming and burdensome. Since the Distance Information is displayed sequentially throughout the inspection length, a viewer wishing to look at a particular distance location while watching the video must fast-forward or rewind the VCR tape to find that Distance Information and/or manually write the information down.

Digitally Logged

This digital log provides a step in the right direction—but it also has problems of its own. The user may or may not choose to record the Distance Information as text overlay on the video. This method presents the same problems as the "Text Overlay" approach described above. Also, the Distance Information may be recorded in some sort of digital log file, typically through use of a database that permits retrieval of the information on demand. Although this solves part of the Distance Information access problem, an additional major obstacle remains. This digital log file must accompany the digital video file in order to use or retrieve the Distance Information. Hypothetically, what would happen if this file is lost or otherwise separated from the digital video file? The pipeline segment must then be re-inspected and the owner incurs both time delays and substantial additional expense.

Solution Proposed via this Invention:

Thus there has existed a long-felt need for system that efficiently and promptly make data available to the user with highest accuracy in a manner that user can take action from his computer and add notes or notify about the next step in the process. This can be achieved via application software that can be developed as client server or internet based application to serve media over the net for the users to view and take actions as required. This approach will efficiently create opportunity for fast response and accuracy of the information as well as availability of the data over the net for management of over all process. This invention also propose the solution to develop the DVD media, with range of format like DivX, Blue-Ray, HD-DVD, MPEG ranges, and other digital format for the images with the electronic log embedded in the media to play with DVD and/or other digital media players, so that it is easy to view and reply the information and storage can be managed efficiently. These stored media can be played over the computer or external players for review purpose. The current invention provides just such a solution by having a single digital file to maintain all the related information for the subcam system. This will eliminate the problems discussed by providing this invention solution with following details:

For Header information:

VCR & Text Overlay Approach

This problem has been eliminated. The text overlay is now being digitally logged, so there is no longer a need to display this information on the video itself.

Standard Digital Video Approach

Digital video files may be used to store and retrieve text values. Using this approach, the Header Information can be stored directly within the digital video file, and then retrieved at any time on demand—thus eliminating the possibility of the digital video and digital log file becoming separated. Since this data is now stored digitally, the Header Information is now easily used without fear of "misplacing" it.

For Log Information:

Hand Written Logs

This has been solved by storing the Observation Information digitally.

Text Overlay

This problem has been eliminated. The text overlay is now being digitally logged, so there is no longer a need to display this information on the video itself.

Digital Log

Digital video files have the ability to store and retrieve text values that are stored at specific times in the video. Using this approach, the Observation Information can be stored directly within the digital video file at the exact moment the observation takes place, and then retrieved at any time on demand. This eliminates the possibility of the digital video and digital log file becoming separated. Since this data is now stored digitally, the Observation Information can now be easily used without the fear of misplacing it.

For Distance Information:

Text Overlay

This problem has been eliminated. The text overlay is now being digitally logged and there is no longer need to display this information on the video itself.

Digital Log

Digital video files provide the means to store and retrieve text values that are recorded at specific times in the video. Drawing upon this capability, the Distance Information can be stored directly within the digital video file at the exact moment a change of distance takes place, and can then be retrieved at any time on demand—thus eliminating the possibility of the digital video and digital log file becoming separated. Since this data is now stored digitally, the Digital Information can now be easily used without the fear of misplacing it.

SUMMARY OF THE INVENTION

The Invention provides specific and proprietary means to digitally record CCTV inspection Header Information, Defect Observation Data, and Distance Information; combine this data into a single digital file; and store it within the video files—from which it may be retrieved by compatible application software and serve as a basis for inspection viewing, reviewing, evaluation, report generation, and other uses provided or supported by compatible application software features.

a. Distance Information:

The means and methods for acquiring Distance Information, storing that data, and retrieving it for use in the SubCam CCTV Inspection Data Management System—or any other CCTV-related task(s) that rely upon distance measurements—is unique and proprietary. The Distance Information component of the "System" was conceived, developed, and perfected by the Patent Applicant.

i. Technical Aspects:

The objective and purpose of the SubCam Distance Information System is to provide the means and methods to digitally record distance data associated with CCTV pipeline inspections conducted "in the field" and subsequently transported to an office or other location for review, analysis, and grading. To accomplish this, the system creates a file—such as a database—that defines the correlation between the video position and the distance that the camera has traveled from a primary reference point. The office system uses this database as a reference table, thus creating a "virtual footage encoder".

The SubCam CCTV Inspection Data Management System will record inspection header information and video for the selected pipeline segment being inspected. Along with the video, the system will record a specific reference file that associates the video position (in time) to the distance that the camera has traveled in the pipe. "Time" will be recorded on each frame of the CCTV inspection. When the footage system is calibrated at the beginning of an inspection, the time recorded on the initial frame will correspond to the initial calibrated distance from the primary reference point—normally, the centerline of the access point (manhole). Each time the footage counter transmits a signal that indicates forward or backward camera movement of a known distance (normally $\frac{1}{10}^{th}$ lf), the time into the recorded video will be matched with the associated distance for that time and the data recorded in a look-up table/database. The Distance Information System is not limited specifically to a time reference, any video reference can be used to create this distance/video reference table.

ii. Increased Efficiency and Eliminated of Potential for Bottlenecks:

Perhaps the most notable characteristic of the SubCam Distance Information System is the fact that the relationship between video and recorded footage is not based upon random "markers" placed on the video (during performance of routine field inspection tasks by CCTV operators). Instead, that footage data acquisition is independent of operator input and is a "constant" process based upon the time recorded on each video frame—thus providing access to footage readings/locations for any location on the video at any time—whether reference has been established to a discreet observed pipeline condition observed during initial inspection OR observed and recorded at later time during review at a different location.

In addition to recording the distance information, which is only related to the distance within the pipe inspection, a GPS coordinate will be calculated and stored. The GPS coordinate will be calculated based on the starting GPS point and the current distance from that point. These GPS coordinates can then be retrieved later to pinpoint the exact location of an observation or defect. GPS information and relative location relationship can be stored in the database and will be incorporate into the media so that it will be easy to view and relate the inspected data.

This unique capability provides an extended level of flexibility not associated with current means and methods of distance information management—since, under most current operating regimens, CCTV operators are required to observe pipeline conditions/defects, code the observations, and grade pipe conditions as part of their day to day job while conducting on-site CCTV pipeline inspections. The SubCam system simplifies this regimen by optionally permitting field inspections that simply consist of non-coded video—every foot of which is related to a footage location at any point in the inspection video data and readily retrievable from the look-up table in which that data is stored—thus, eliminating the need to create video overlays to serve as a basis for footage data manually entered when coding is performed at times and locations differing from those of the original inspection.

Since most operators have not been formally trained as engineers and/or have not had the advantage of similar technical training, they may lack the necessary credentials to assure consistent accuracy in pipeline assessment—and a simple mistake can cost thousands of dollars. By using the SubCam distance management system, maximum use may be made of personnel trained specifically to operate CCTV camera systems, but not required to exercise technical assessment judgment—since this system readily facilitates review and assessment of inspections by office-level technicians specifically trained to perform such tasks—after the basic field data has been recorded on video.

b. Total Integration:

The unique and proprietary design of the SubCam CCTV Inspection Data Management System provides exclusive means and methods to integrate Header Information, Defect Observations, and Footage Location Data into a single digital file stored in the video files (rather than other means such as single or multiple databases) and provide access to the data for viewing, reviewing, assessment, report generation, and other tasks—including construction of databases compatible with transfer standards such as those established by NASSCO's PACP program.

DETAILED DESCRIPTION OF THE FIGURES

Figure 1:
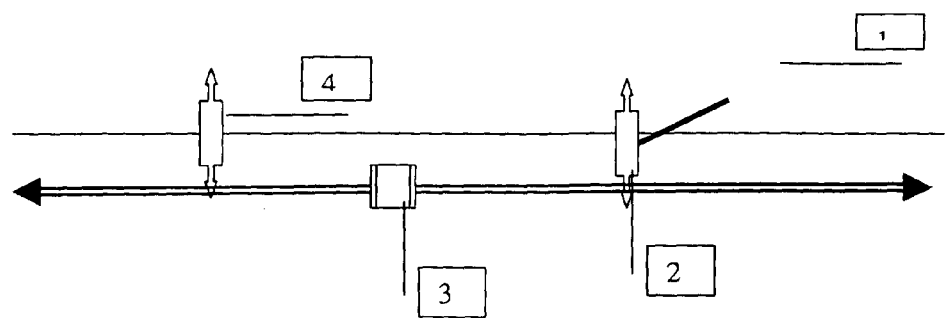
FIG. 1 is prior art showing the layout of a traditional job site.

FIG. 1 is a presentation of prior art of data acquisition.

1. CCTV truck is presented at the location where data is to be gathered.

2. Manholes or the points that are decided along with the pipeline to take the measurements.

3. Coupling or the joints in the pipeline.

4. Data acquisition point.

Following is presentation of process and techniques that prior art uses.

Figure 2:
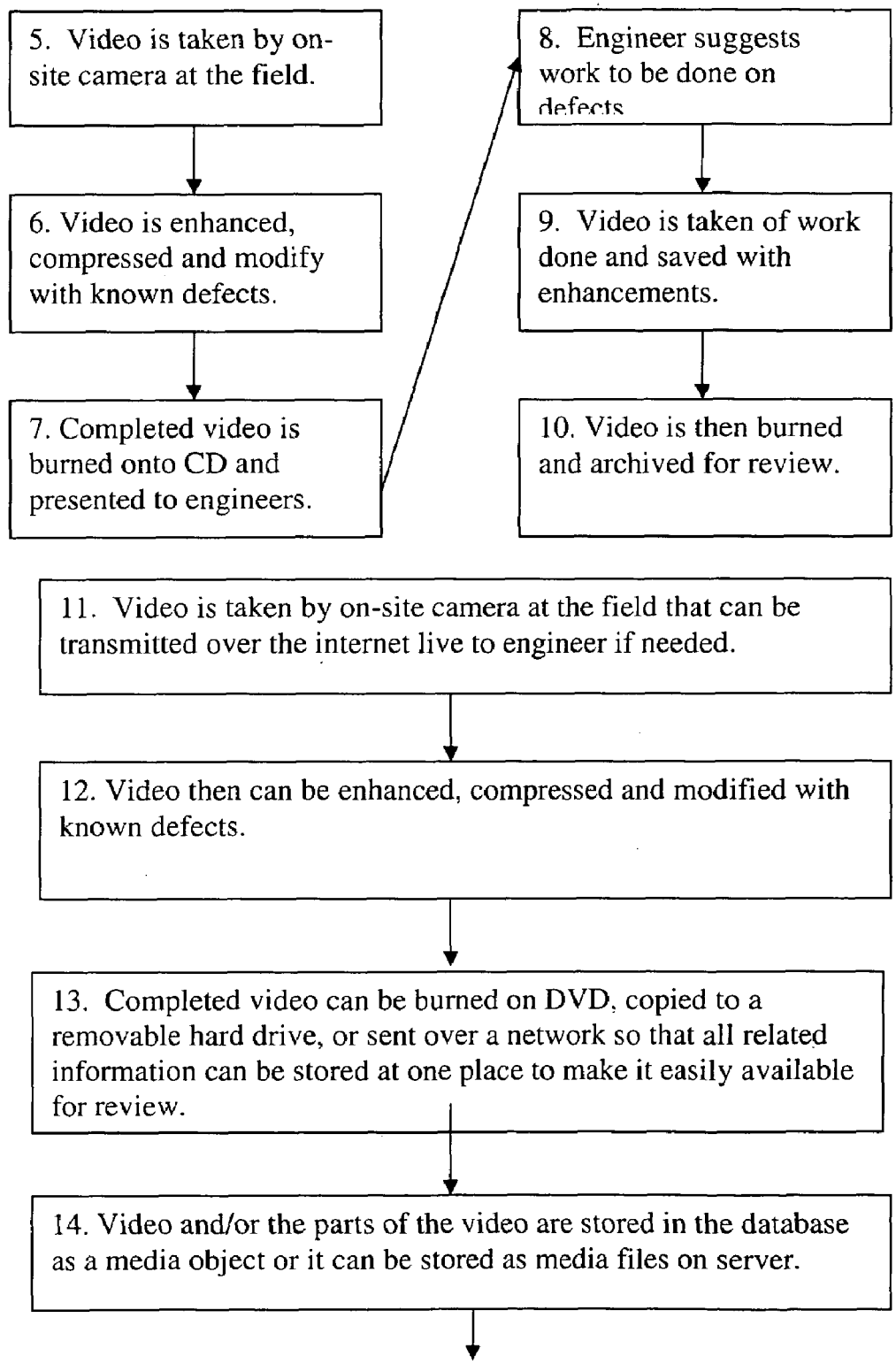
FIG. 2 is prior art showing the known use of CD's and other digital media.

FIG. 2. Prior process using CD or other digital media.

Under the current state of the art, a video is taken by an on-site camera in the field. The video is then enhanced, compressed and modified with known defects, and the completed video is burned onto a CED and given to engineers familiar with sewer lines and defects. After inspecting the video, the engineers suggest a course of work to be done to rectify the defects. The work is then performed and a video taken of the work done and saved with enhancements. The video is then burned and archived for later review.

The video is then taken by an on-site camera at the field that can be transmitted over the internet live to an engineer if needed. It can also be enhanced, compressed and/or modified with known defects. The completed video can then be burned on a DVD, copied to a removable hard drive, or sent over a network so that all related information can be stored at one place to make it easily available for review. The video and/or the parts of the video are stored in a database as a media object or it can be stored as media files on a server. A database system is created to support the information storage related to each video and inspection that can be stored for a retrieval system. Video and related information such as headers and defects, and/or footage/GPS information can be part of the overall application system.

A software application system enables the retrieval of various inspections with video and related information, and allows a user to update the video with comments as necessary. The software application also allows a user of the invention to view video by selectively checking the start time or defect point. This application can be available over the internet or in client server mode.

The software application may also allow a user or engineer with given privilege the ability to access the video and update the information for further action or notification or workflow to automate the steps in the process. Once the correction is performed and information needs to be updated, the user/engineer can update the information remotely on-site or in the system, along with uploading correction video.

All information in database and/or server are back-up routinely for security and future reference. Application allows speeding up retrieval of information and processing time and easy to view media.

Figure 3:
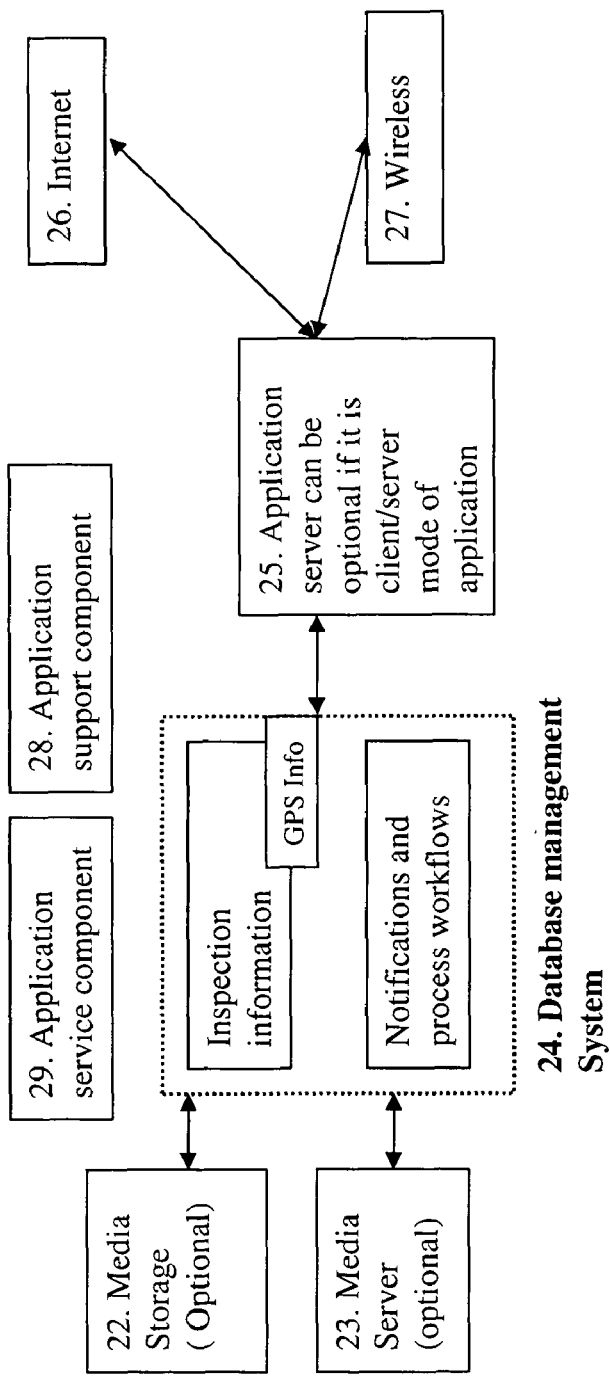
FIG. 3 is a schematic of how the current invention operates.

FIG. 3. Proposed solution detailed flow.

The invention takes the existing process and adds considerable improvements to the storage, maintenance, workflow maintenance, and retrieval of information. Information from step 21 in FIG. 2 is taken and stored/transmitted through optional media storage means and media servers to an application server, through filters which include inspection information, GPS information, along with notifications and process workflows. At the application server, the information can be transmitted either through the internet or over a wireless network, where the information can be modified and used via application support and application service.

What I claim is:

1. A method for field inspection comprising the steps of:
    capturing video of inspected points of interest,
    formatting and preparing the video in digital format with low size and high quality thereby creating a digital video file,
    integrating additional data into the digital video file thereby creating an integrated digital video file, where the additional data comprises header information, defect observations, and distance information, where header information is critical information corresponding to the field inspection, defect observations are observations made by a user corresponding to the field inspection, and distance information comprises the distance from a primary reference point to where the video is captured correlated to a position in the digital video file,
    transferring the integrated digital video file to a data storage medium, and
    using the distance information in the integrated digital video file to locate a position in the video of the integrated digital video file, and
    viewing the video of the integrated digital video file starting at the located position and viewing any corresponding header information and defect observations.

2. The method of claim 1, additionally comprising the step of compressing and formatting the integrated digital video file for playback on a digital video disc (DVD) player.

3. The method of claim 1, where the data storage medium is selected from the group consisting of a digital video disk (DVD) and a removable hard disk.

4. The method of claim 1, where the distance information for a given position in the digital video file is stored with GPS coordinates.

5. The method of claim 1, wherein transferring the integrated digital video file to a data storage medium comprises storing the integrated digital video files on a server.

6. The method of claim 1, wherein transferring the integrated digital video file to a data storage medium comprises transmitting the integrated digital video file over the internet to a software application.

7. The method of claim 1, wherein transferring the integrated digital video file to a data storage medium comprises transmitting the integrated digital video file over a wireless network.

8. The method of claim 1, additionally comprising the step of integrating a second set of additional data into the integrated digital video file thereby creating a second integrated digital video file.

* * * * *